(12) United States Patent
Maegawa et al.

(10) Patent No.: US 9,234,559 B2
(45) Date of Patent: Jan. 12, 2016

(54) JOINED BODY, SHOCK ABSORBER, AND METHOD FOR MANUFACTURING SHOCK ABSORBER

(71) Applicant: HITACHI AUTOMOTIVE SYSTEMS, LTD., Ibaraki (JP)

(72) Inventors: Yusuke Maegawa, Yokohama (JP); Fumiyuki Yamaoka, Sagamihara (JP); Makoto Nishimura, Hachioji (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 124 days.

(21) Appl. No.: 13/721,533

(22) Filed: Dec. 20, 2012

(65) Prior Publication Data
US 2013/0161141 A1    Jun. 27, 2013

(30) Foreign Application Priority Data
Dec. 27, 2011    (JP) .................................. 286639/2011

(51) Int. Cl.
F16J 1/10          (2006.01)
F16F 9/32          (2006.01)

(52) U.S. Cl.
CPC ............. *F16F 9/3235* (2013.01); *F16F 9/3221* (2013.01); *F16F 9/3271* (2013.01); *Y10T 29/49826* (2015.01)

(58) Field of Classification Search
CPC ......... F16F 9/3235; F16F 9/3271; F16B 4/00; F16B 39/02; F16C 3/02; Y10T 403/4949; Y10T 403/7073
USPC ........ 267/64.11, 64.12, 120; 403/274; 92/129
See application file for complete search history.

(56) References Cited

U.S. PATENT DOCUMENTS

| 4,097,163 | A | * | 6/1978 | Dubuque ...................... 403/274 |
| 4,307,875 | A | * | 12/1981 | Schnitzius et al. ............ 267/120 |
| 4,323,224 | A | * | 4/1982 | Freitag et al. ............... 267/64.12 |
| 5,106,065 | A | * | 4/1992 | Staton et al. ............... 267/64.11 |
| 5,839,719 | A | * | 11/1998 | Hosan et al. ............... 267/64.12 |
| 7,784,394 | B2 | * | 8/2010 | Nishimura ...................... 92/129 |

(Continued)

FOREIGN PATENT DOCUMENTS

| JP | 60-123410 | 8/1985 |
| JP | 4-249632 | 9/1992 |
| JP | 2001-343044 | 12/2001 |

(Continued)

OTHER PUBLICATIONS

Office Action issued Aug. 25, 2015 in corresponding Japanese patent application No. 2011-286639 (with partial English translation).

*Primary Examiner* — Christopher Schwartz
(74) *Attorney, Agent, or Firm* — Wenderoth, Lind & Ponack, L.L.P.

(57) ABSTRACT

A joined body includes a first member having a female portion, and a second member having a male portion inserted in the female portion at one end, and an annular groove along an outer circumference of the male portion. The first member and the second member are fitted to each other. A plurality of joint portions is formed on a side wall of the female portion. The joint portions are joined to the male portion by being pushed in the annular groove. A pressing portion is formed at the female portion so as to face a position of the male portion axially different from the annular groove of the male portion. The pressing portion pressed against the male portion.

20 Claims, 13 Drawing Sheets

(56) References Cited

U.S. PATENT DOCUMENTS

2002/0041790 A1* 4/2002 Suzuki et al. ................ 403/280
2008/0072654 A1 3/2008 Nishimura

FOREIGN PATENT DOCUMENTS

| JP | 2005-114112 | 4/2005 |
| JP | 2008-55483 | 3/2008 |

* cited by examiner

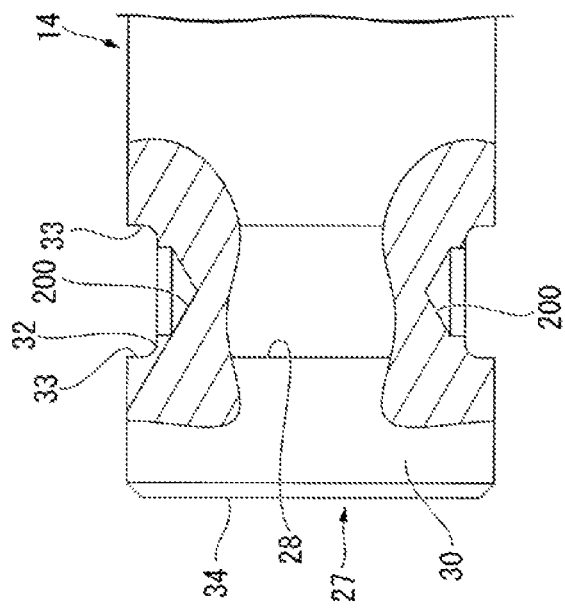
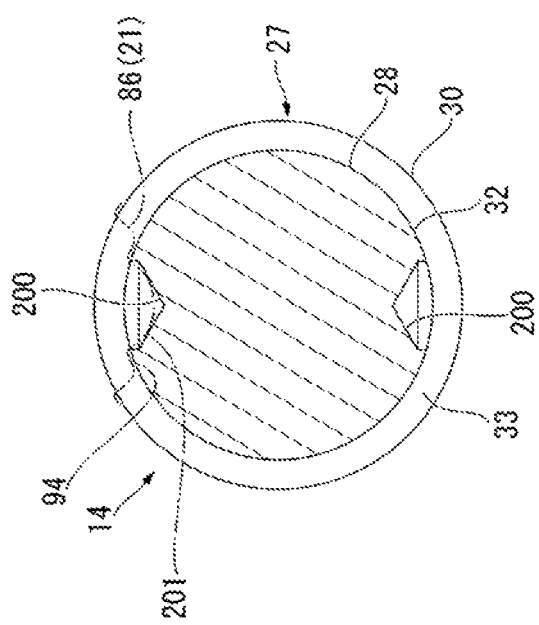
Fig. 11A
Fig. 11B

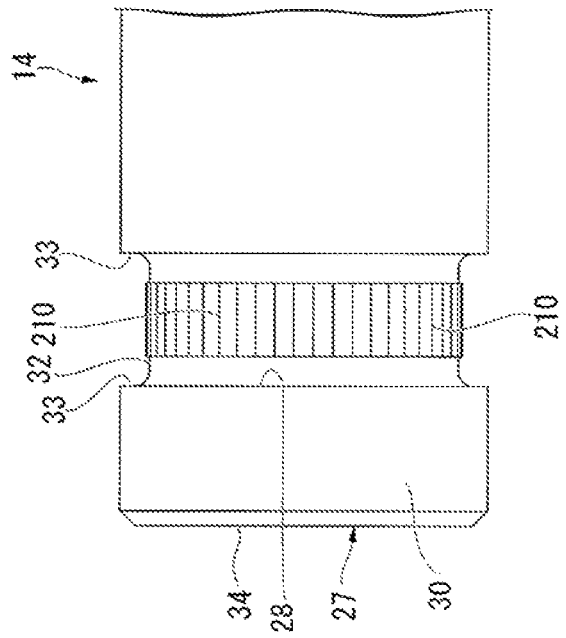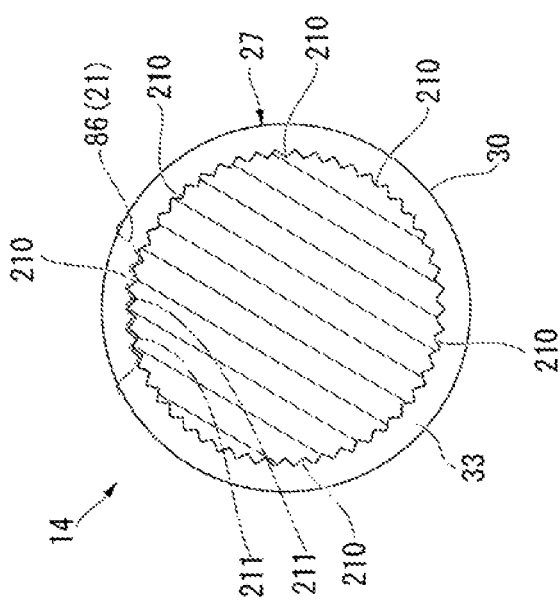

JOINED BODY, SHOCK ABSORBER, AND METHOD FOR MANUFACTURING SHOCK ABSORBER

BACKGROUND OF THE INVENTION

1. Technical Field

The present invention relates to a joined body, a shock absorber, and a method for manufacturing a shock absorber.

2. Description of the Related Art

For example, Japanese Patent Public Disclosure No. 2008-55483 discloses a technique for fitting a female portion to a male portion with a plurality of annular grooves formed thereon, and mechanically clinching the female portion in a staggered manner, thereby joining the male portion and the female portion.

SUMMARY OF THE INVENTION

However, mechanically clinching the female portion in a staggered manner, like the technique disclosed in Japanese Patent Public Disclosure No. 2008-55483, has a problem with its workability.

Therefore, an object of the present invention is to provide a joined body, a shock absorber, and a method for manufacturing a shock absorber with improved workability.

To achieve the foregoing and other objects, the present invention is configured in such a manner that a plurality of joint portions, which is pushed in and joined to an annular groove of a male portion, is formed at a side wall of a female portion, and a pressing portion, which is pressed against the male portion, is formed at the female portion so as to face an axially different position from the annular groove of the male portion.

Further, the present invention is configured in such a manner that a plurality of joint portions, which is pushed in and joined to an annular groove of a rod, is formed at a side wall of a connection cylinder portion, and a pressing portion, which is pressed against the rod, is formed so as to face a position axially different from the annular groove.

Further, the present invention includes performing a joining process for joining a mounting eye and a rod by inserting the rod in a connection cylinder of the mounting eye, and pushing a side wall of the connection cylinder portion in an annular groove of the rod, after coating of a mounting eye, coating of a cylinder, and plating of a rod.

BRIEF DESCRIPTION OF THE DRAWINGS

FIGS. 7A, 7B, and 7C are a planer view, a front view, and a bottom view, respectively;

FIGS. 11A and 11B illustrate main parts of a rod according to a second embodiment of the present invention, and in particular, FIGS. 11A and 11B are a sectional side view and a partially sectioned front view, respectively;

FIGS. 12A and 12B illustrate main parts of a rod according to a third embodiment of the present invention, and in particular, FIGS. 12A and 12B are a sectional side view and a front view, respectively;

DETAILED DESCRIPTION OF THE INVENTION

"First Embodiment"

A first embodiment of the present invention will be described below with reference to FIGS. 1 to 10.

Figure 1:
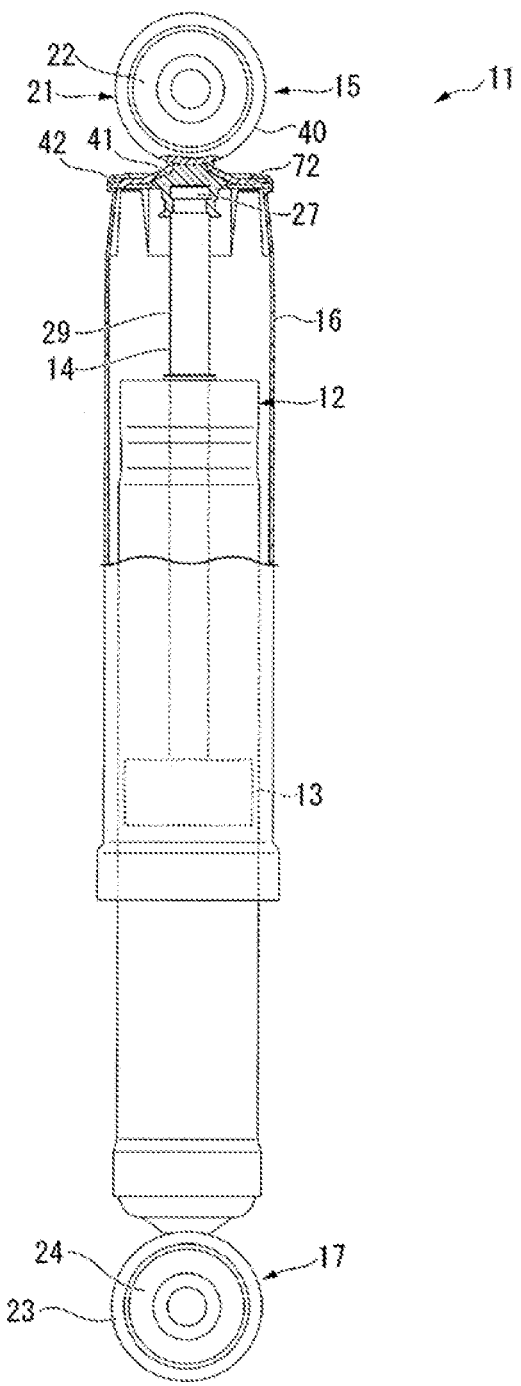
FIG. 1 is a partially sectioned front view illustrating a first embodiment of the present invention.

FIG. 1 illustrates a shock absorber 11 as the first embodiment. This shock absorber 11 is used for a suspension apparatus for an automobile. The shock absorber 11 includes a cylinder 12 sealing containing hydraulic fluid such as oil, a piston 13 slidably inserted in the cylinder 12, a rod (a second member) 14 having one end coupled to the piston 13 and the other end extending to the outside of the cylinder 12, a mounting eye 15 attached to the other end of the rod 14, a dust cover 16 supported by the mounting eye 15 and covering a portion of the rod 14 that extends from the cylinder 12, and a mounting eye 17 attached to an opposite end of the cylinder 12 from the rod 14. The mounting eye 15 includes an outer eye main body (a first member) 21 attached to the rod 14, and an inner rubber bush 22. Similarly, the mounting eye 17 also includes an outer eye main body 23 attached to the cylinder 12 and an inner rubber bush 24.

For example, one of the mounting eyes 15 and 17 of the shock absorber 11 is supported by a vehicle body, and the other is coupled to a wheel side. More specifically, the shock absorber 11 is coupled to the vehicle body side via the mounting eye 15 attached to the rod 14, and is coupled to the wheel side via the mounting eye 17 attached to the cylinder 12. Conversely, the shock absorber 11 may be coupled to the vehicle body side via the mounting eye 17 attached to the cylinder 12, and may be coupled to the wheel side via the mounting eye 15 attached to the rod 14.

Figure 2:
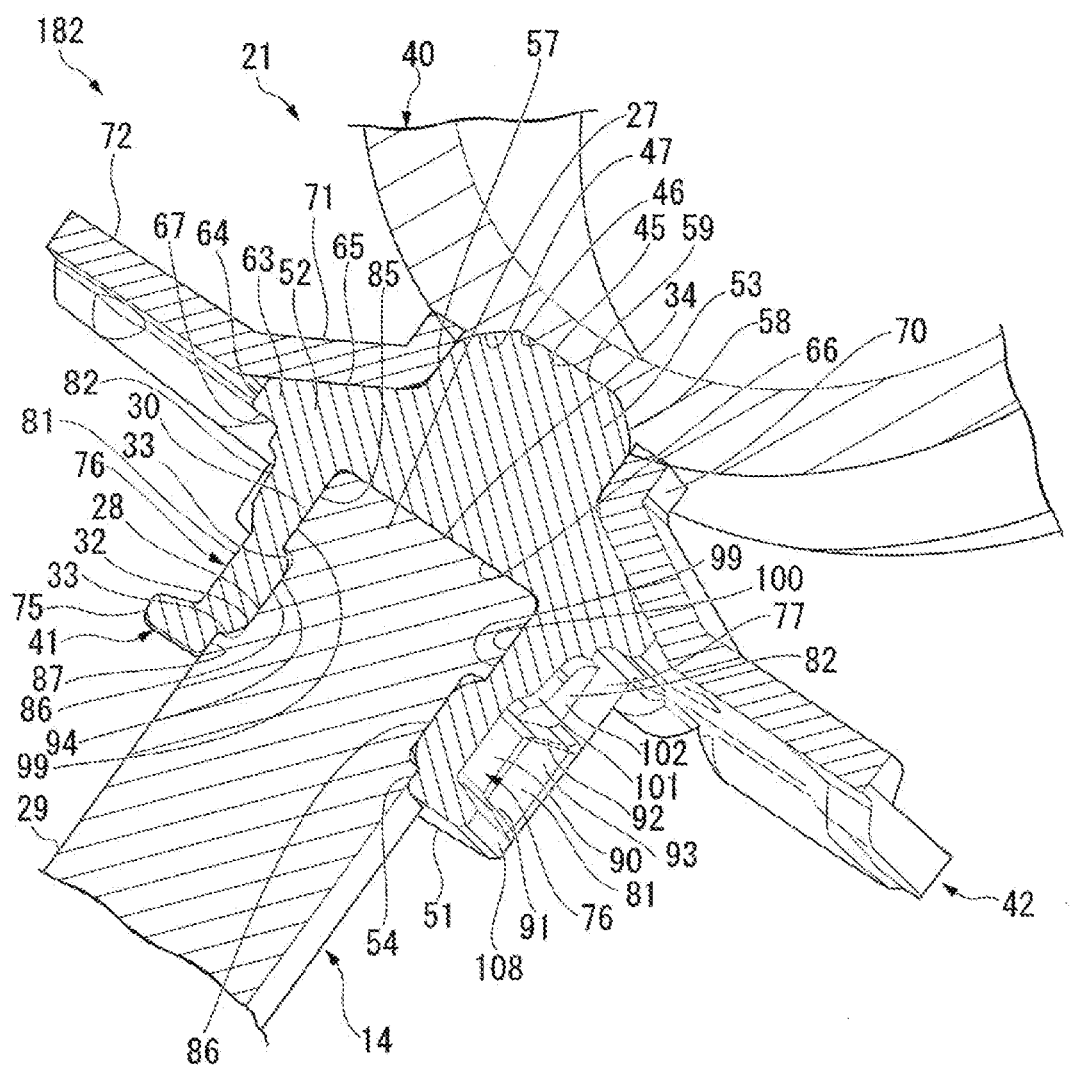
FIG. 2 is a sectioned perspective view including a central line of a rod, illustrating main parts of the first embodiment of the present invention.
Figure 3:
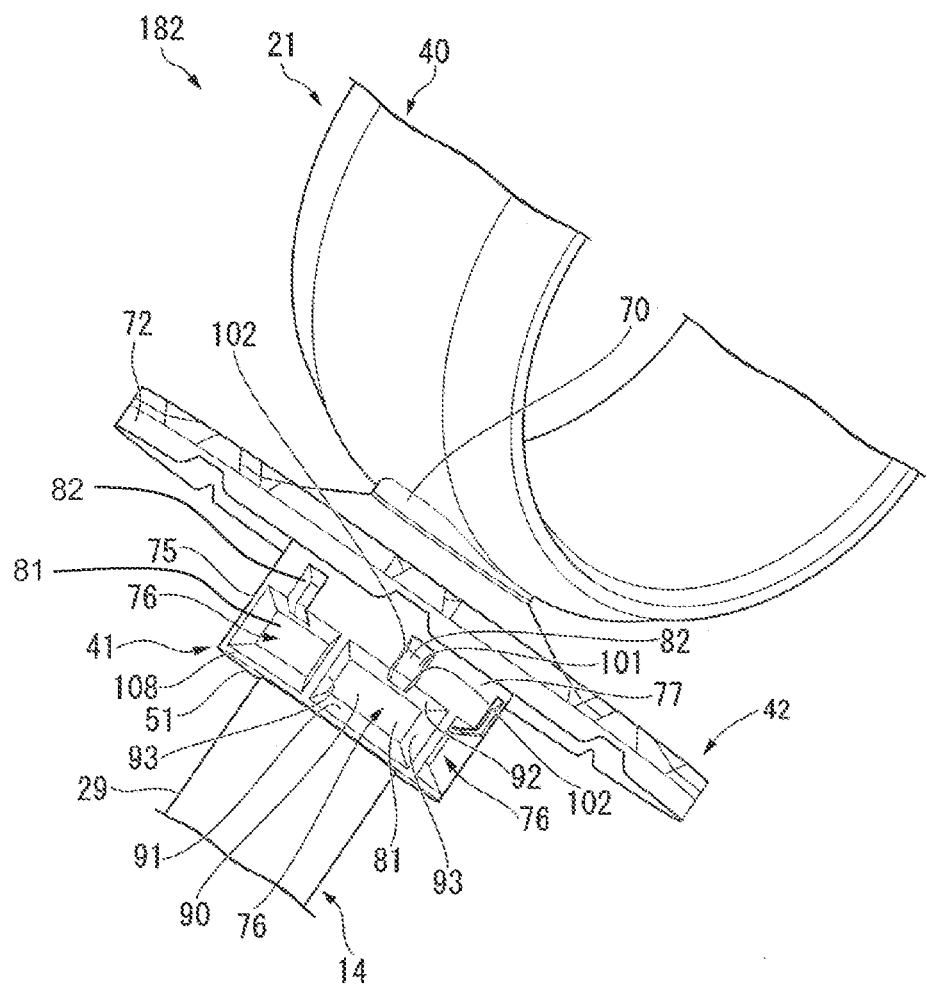
FIG. 3 is a perspective view illustrating the main parts of the first embodiment of the present invention.

As described above, the eye main body 21 is attached to the one end of the rod 14, and this one end of the rod 14 constitutes a male portion 27, which is a solid rod-like body circular in cross section, and is configured to be fitted in the eye main body 21. Hereinafter, the one end of the rod 14 at the side attached to the eye main body 21 will be referred to as the "insertion-side end". As illustrated in FIGS. 2 and 3, the male portion 27 includes an annular groove 28 along an outer circumference at an intermediate predetermined position in an axial direction. A portion of an outer circumference of the male portion 27 except for the annular groove 28 constitutes a fitted cylindrical surface portion (a fitted portion) 30, which extends continuously from an outer circumferential surface of an intermediate shaft portion 29 connected to the male portion 27 of the rod 14, keeping a same diameter from the intermediate shaft portion 29 and a constant diameter through the entire fitted cylindrical surface portion 30. The fitted cylindrical surface portion 30 has a larger diameter than a groove bottom surface portion 32 of the annular groove 28, which is the smallest in diameter. The groove bottom surface portion 32 of the annular groove 28 is formed so as to have a constant diameter at a portion of the groove bottom surface portion 32 except for both ends in the axial direction of the rod 14, and is formed so as to extend along a same position in the axial direction of the rod 14, keeping a constant width. Groove wall surface portions 33 and 33 at the both ends of the annular groove 28 in the axial direction of the rod 14 extend perpendicularly to a central axis of the rod 14 and connect end edges of the groove bottom surface portion 32 and the fitted cylindrical surface portion 30. In other words, the annular groove 28 is formed annularly with a constant width at a predetermined position in the axial direction of the rod 14. An abutment tip surface portion 34 of the male portion 27 at the tip thereof extends perpendicularly to the central axis of the rod 14.

The eye main body 21 attached to the rod 14 includes an annular member 40 having an annular shape, a female member (a female portion) 41 fixed along a radial direction of the annular member 40 at an outer circumferential portion of the annular member 40, and a holding member 42 disposed between the annular member 40 and the female member 41. The annular member 40, the female member 41, and the holding member 42 are integrally assembled to constitute the eye main body 21.

The annular member 40 includes a single attachment recess portion 45, which is radially internally recessed, at the outer circumferential portion of the annular member 40. The attachment recess portion 45 includes a flat circular attachment bottom surface portion 46 perpendicular to the radial direction of the annular member 40, and an attachment tapering surface portion 47 extending from an outer circumference of the attachment bottom surface portion 46 to the outer circumferential surface of the annular member 40 in a flaring manner. The attachment tapering surface portion 47 shares a same axis with the attachment bottom surface portion 46, and the diameter thereof increases toward the radially outer side of the annular member 40.

The female member 41 includes a cylindrical connection cylinder portion (a first member) 51, a closing bottom portion 52, which closes an axial one side of the connection cylinder portion 51, and an attachment shaft portion 53, which protrudes to an opposite side of the closing bottom portion 52 from the connection cylinder portion 51. The female member 41 further includes an opening portion 54 at an opposite side of the connection cylinder portion 51 from the closing bottom portion 52. The inside of the connection cylinder portion 51 is hollow by being surrounded by an inner-side wall (a side wall) 85, and opens at the opening portion 54. The male portion 27 of the rod 14 (the second member) is inserted from the opening portion 54 into the connection cylinder portion 51.

An outer surface of the attachment shaft portion 53 includes a holding cylindrical surface portion 57 cylindrically protruding from the closing bottom portion 52, an attachment tapering surface portion 58 extending from an opposite side of the holding cylindrical surface portion 57 from the closing bottom surface 52 in a reducing tapering manner, and a flat attachment tip surface portion 59 positioned at an opposite side of the attachment tapering surface portion 58 from the holding cylindrical surface portion 57. The holding cylindrical surface portion 57, the attachment tapering surface portion 58, and the attachment tip surface portion 59 share a same central axis, which matches the central axis of the attachment shaft portion 53. The attachment tip surface portion 59 is perpendicular to this central axis.

The closing bottom portion 52 of the female member 41 includes a flange-like large-diameter portion 63 formed at an end of the closing bottom portion 52 closer to the connection cylinder portion 51 so as to have a larger diameter than a maximum outer diameter of the connection cylinder portion 51. An outer circumferential surface of the large-diameter portion 63 constitutes a large-diameter cylindrical surface portion 64. The closing bottom portion 52 includes a holding tapering surface portion 65 connecting the large-diameter cylindrical surface portion 64 and the holding cylindrical surface portion 57 of the attachment shaft portion 53 in a tapering manner. Further, the closing bottom portion 52 includes a flat abutment bottom surface portion 66 inside the connection cylinder portion 51, and a flat stepped surface portion 67 outside the connection cylinder portion 51. The large-diameter cylindrical surface portion 64, the holding tapering surface portion 65, the abutment bottom surface portion 66, and the stepped surface portion 67 of the closing bottom portion 52 share a same central axis, which matches the central axis of the closing bottom portion 52. The abutment bottom surface portion 66 is perpendicular to this central axis. This central axis matches the central axis of the attachment shaft portion 53, and corresponds to the central axis of the female member 41.

The holding member 42 includes a cylindrical portion 70, a tapering portion 71 extending from an axial one end of the cylindrical portion 70 so as to have an increasing diameter from the cylindrical portion 70 toward axial another side, and a holding plate portion 72 flaring from an opposite side of the tapering portion 71 from the cylindrical portion 70 toward a radially outer side.

The above-described annular member 40, female member 41, and holding member 42 are integrally assembled to constitute the eye main body 21. During this integrally assembling process, first, the cylindrical portion 70 of the holding member 42 is fitted to the holding cylindrical surface portion 57 of the attachment shaft portion 53 of the female member 41, and the inner surface of the tapering portion 71 is placed into abutment with the holding tapering surface portion 65 of the closing bottom portion 52 of the female member 41, whereby the holding member 42 is supported by the female member 41. Next, the attachment tapering surface portion 58 of the attachment shaft portion 53 of the female member 41 is placed into abutment with the attachment tapering surface portion 47 of the annular member 40, and the attachment tip surface portion 59 of the attachment shaft portion 53 of the female member 41 is placed into abutment with the attachment bottom surface portion 46 of the annular member 40, whereby the holding member 42 is placed into abutment with the outer circumferential surface of the annular member 40 at an opposite side of the cylindrical portion 70 from the tapering portion 71. While the respective components are maintained in this state, the cylindrical portion 70 of the holding member 42 and the attachment shaft portion 53 of the female member 41 are fixed to the annular member 40 by welding. As a result, the annular member 40, the female member 41, and the holding member 42 are integrally assembled to constitute the eye main body 21. When they are integrally assembled in this way, the central axis of the female member 41 extends along the radial direction of the annular member 40.

As illustrated in FIG. 1, the dust cover 16 is coupled to the outer circumferential portion of the holding plate portion 72 of the holding member 42, whereby the dust cover 16 is held by the eye main body 21.

Figure 4:
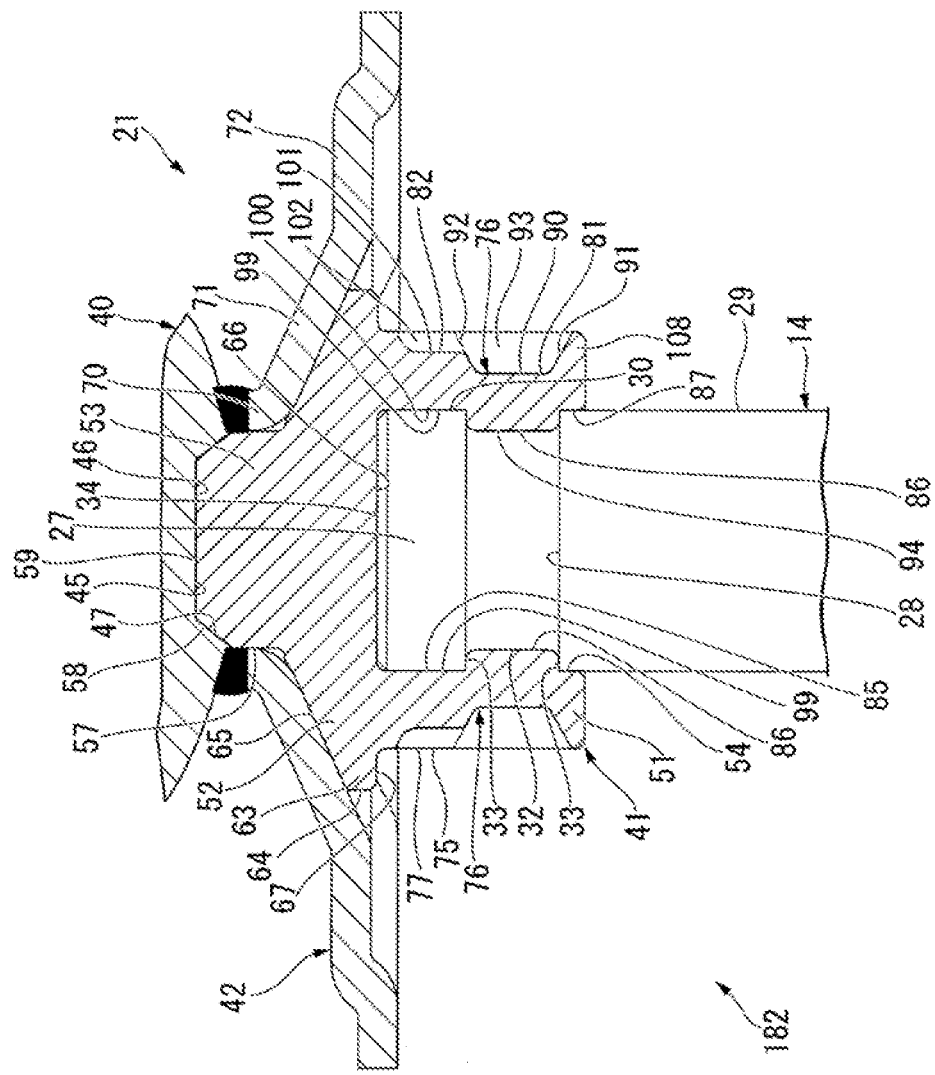
FIG. 4 is a cross-sectional view illustrating the main parts of the first embodiment of the present invention as viewed from the front thereof.

As illustrated in FIGS. 2 to 4, a recess portion 76, which is recessed radially inwardly, is formed at an outer wall 75 of the connection cylinder portion 51 of the female member 41 at the radially outer side by plastic working. Before plastic working is performed, the connection cylinder portion 51 has a cylindrical shape coaxial with the central axis of the attachment shaft portion 53 and the closing bottom portion 52. Then, the male portion 27 at the other end (the insertion-side end) of the rod 14 (the second member), which extends to the outside of the cylinder 12, is inserted into the opening portion 54 of the cylindrical connection cylinder portion (the first member) 51 in such a manner that the abutment tip surface portion 34 of the male portion 27 is in abutment with the abutment bottom surface portion 66 of the female member 41. In other words, the female member 41 of the eye main body 21 and the male portion 27 of the rod 14 are fitted to each other. Therefore, the cylindrical connection cylinder portion 51 has an inner diameter slightly larger than the fitted cylindrical surface portion 30 of the male portion 27 of the rod 14, and the connection cylinder portion 51 and the rod 14 are fitted as a clearance fit. The male portion 27 of the rod 14 corresponds to the portion of the rod 14 that is inserted in the connection cylinder portion 51 of the female member 41. The annular groove 28 is formed at a middle position at an axially opposite side of the male portion 27 from the abutment tip surface portion 34.

The groove-like recess portion 76, which partially extends in the circumferential direction of the female member 41, is formed on the outer wall 75 of the cylindrical connection cylinder portion 51 by plastic deformation, which is performed from the outer circumferential surface by swaging processing. The outer circumferential surface of the outer wall 75 of the connection cylinder portion 51 except for the recess portion 76 constitutes a cylindrical outer circumference cylindrical surface portion 77. If the central axis of the outer circumferential surface portion 77 is designed to correspond to the central axis of the connection cylinder portion 51, this central axis also matches the central axis of the female member 41.

As illustrated in FIGS. 2 and 3, the recess portion 76 includes an opening-side recess portion 81 and a bottom-side recess portion 82. The opening-side recess portion 81 is located axially closer to the opening portion 54 of the female member 41, and is deep in the radial direction of the female member 41 and is wide in the circumferential direction of the female member 41. The bottom-side recess portion 82 axially extends from the opening-side recess portion 81 toward the closing bottom portion 52 of the female member 41, and is shallower in the radial direction of the female member 41 than the opening-side recess portion 81, and narrower in the circumferential direction of the female member 41 than the opening-side recess portion 81. In other words, as illustrated in FIG. 3, the recess portion 76 has a T shape as viewed from the radial direction of the female member 41. The opening-side recess portion 81 has a longer length thereof in the circumferential direction than the length thereof in the axial direction of the female member 41. On the other hand, the bottom-side recess portion 82 has a longer length thereof in the axial direction than the length thereof in the circumferential direction of the female member 41.

As illustrated in FIGS. 2 to 4, the opening-side recess portion 81 is aligned with the annular groove 28 of the rod 14 in the axial direction of the female member 41 and the rod 14 in such a state that the abutment tip surface portion 34 of the rod 14 is in abutment with the abutment bottom surface portion 66 of the female member 41. A joint portion 86, which radially inwardly protrudes by formation of the opening-side recess portion 81 and is joined by being pushed in the annular groove 28 of the rod 14, is formed on the inner-side wall (the side wall) 85 in the radially inner side at a position of the opening-side recess portion 81 in the axial direction of the female member 41. Therefore, this joint portion 86 is also formed by plastic deformation based on the above-described swaging processing. The connection cylinder portion 51 remains cylindrical except for the joint portion 86 on the inner-side wall 85 at the radially inner side, and constitutes an inner circumferential cylindrical surface portion 87. The central axis of the inner circumferential cylindrical surface portion 87 also matches the central axis of the female member 41.

The opening-side recess portion 81 includes a cylindrical bottom surface portion 90, the center of which matches the central axis of the female member 41, at a deepest position. The opening-side recess portion 81 includes a wall surface portion 91 radially outwardly extending from an end edge of the bottom surface portion 90 closer to the opening portion 54 in the axial direction of the female member 41, a wall surface portion 92 radially outwardly extending from an end edge of the bottom surface portion 90 at an opposite side from the opening portion 54 in the axial direction of the female member 41, and a pair of wall surface portions 93 (only one of them is illustrated in FIGS. 2 and 4, since they illustrate cross sections) radially outwardly extending from both end edges of the bottom surface portion 90 in the circumferential direction of the female member 41. The bottom surface portion 90 is formed at a predetermined position in the axial direction of the female member 41 so as to have a constant width in the circumferential direction.

The wall surface portion 91 closer to the opening portion 54 is slightly inclined in such a manner that an outer side of the wall surface portion 91 in the radial direction of the female member 41 is positioned closer to the opening portion 54 in the axial direction. The wall surface portion 92 at an opposite side from the opening portion 54 is slightly inclined in such a manner that an outer side of the wall surface portion 91 in the radial direction of the female member 41 is positioned closer to the opposite side from the opening portion 54 in the axial direction of the female member 41. The pair of wall surface portions 93 is also slightly inclined in such a manner that outer sides of the wall surface portions 93 in the radial direction of the female member 41 are spaced apart from each other by an increasing distance. In other words, the opening-side recess portion 81 has such a gradually narrowing shape that the width thereof in the axial direction of the female member 41 tapers toward the bottom surface portion 90, and the width thereof in the circumferential direction of the female member 41 also tapers toward the bottom surface portion 90.

The bottom surface portion 90 of the opening-side recess portion 81 as a whole is formed within a range of the annular groove 28 of the rod 14, i.e., between the groove wall surface portions 33 and 33 at the both sides in the axial direction of the female member 41.

The joint portion 86 is inserted in the annular groove 28 of the rod 14, and the abutment surface portion 94 at the tip of joint portion 86 abuts against the groove bottom surface portion 32 in plane contact with the groove bottom surface portion 32. Further, as illustrated in FIG. 2, the joint portion 86 is in abutment with the groove wall surface portions 33 and 33 at both sides of the annular groove 28 at least the opposite end of each groove wall surface portion 33 from the groove bottom surface portion 32, i.e., the joint portion 86 is in abutment with each of the groove wall surface portions 33 and 33 at least at the opening side of the annular groove 28. The joint portion 86 also has a shape short in the axial direction and long in the circumferential direction of the female member 41 in a similar manner to the opening-side recess portion 81.

The bottom-side recess portion 82 is axially out of alignment with the annular groove 28 of the rod 14 in such a state that the abutment tip surface portion 34 of the rod 14 is in abutment with the abutment bottom surface portion 66 of the female member 41. A pressing portion 99 is formed on the inner-side wall 85 at a position of the bottom-side recess portion 82 in the axial direction of the female member 41. The pressing portion 99 slightly radially inwardly protrudes beyond the inner circumference cylindrical surface portion 87 by formation of the bottom-side recess portion 82 so as to be pressed against the fitted cylindrical surface portion 30 between the annular groove 28 and the abutment tip surface portion 34 of the rod 14. Therefore, this pressing portion 99 is also formed by plastic deformation based on the above-described swaging processing. In other words, the pressing portion 99, which is pressed against the male portion 27, is formed at the female member 41 so as to face the fitted cylindrical surface portion 30 at a position axially different from the annular groove 28 of the male portion 27 of the rod 14. In further other words, the joint portion 86, which is joined by being pushed in the annular groove 28, and the pressing portion 99, which is pressed against the rod 14 facing a position axially different from the annular groove 28, are formed on the inner-side wall 85 of the female member 41 at the radially inner side.

The pressing portion 99 abuts against the fitted cylindrical surface portion 30 at an abutment surface portion 100 as the protruding tip of the pressing portion 99 in plane contact with the fitted cylindrical surface portion 30. This pressing portion 99 does not have a portion recessed in the radial direction of the female member 41 from the abutment surface portion 100 between the pressing portion 99 and one of portions of the joint portion 86 in abutment with both the groove wall surface portions 33, which are positioned at the opposite side from the opening portion 54, as a result of which the pressing portion 99 is connected to the joint portion 86 at the abutment surface portion 100. In other words, the pressing portion 99 is formed continuously with the joint portion 86 in the axial direction of the female member 41, i.e., the axial direction of the rod 14. In other words, the pressing portion 99 is constantly in contact with the end of the fitted cylindrical surface portion 30 closer to the annular groove 28 at least at the side closer to the abutment tip surface portion 34 relative to the annular groove 28 of the rod 14 while applying a pressing force. The pressing portion 99 is formed so as to extend from the joint portion 86 in the direction of the axial one end of the rod 14 with the male portion 27 formed thereon, i.e., the direction of the abutment tip surface portion 34, i.e., the direction of the closing bottom portion 52 of the female member 41.

As illustrated in FIGS. 2 and 3, the bottom-side recess portion 82 is open at a middle position of the wall surface portion 92 of the opening-side recess portion 81 in the circumferential direction of the female member 41 at the end closer to the closing bottom portion 52. The bottom-side recess portion 82 includes a bottom surface portion 101, which extends along the circumferential direction of the female member 41, and a pair of wall surface portions 102 (only one of them is illustrated in FIGS. 2 and 4, since they illustrate cross sections), which radially outwardly extend from both end edges of the bottom surface portion 101 in the circumferential direction of the female member 41. The bottom surface portion 101 has a shape that defines a circular arc concaved inwardly in the radial direction of the female member 41 from the portion of the outer circumferential cylindrical surface portion 77 closer to the closing bottom portion 52 toward the opening-side recess 81, and then substantially complies with the axial direction of the female member 41. Further, the bottom surface portion 101 of the bottom-side recess portion 82 is radially inwardly inclined at the side closer to the opening-side recess portion 81 and is connected to the groove bottom surface portion 32 of the opening-side recess portion 81.

The pair of wall surface portions 102 extends substantially in parallel. In other words, an angle defined by the pair of wall surface portions 102 is smaller than an angle defined by the pair of wall surface portions 93 of the opening-side recess portion 81. The pressing portion 99 also has a shape short in the circumferential direction and long in the axial direction of the female member 41 in a similar manner to the bottom-side recess portion 82, and is shorter than the joint portion 86 in the circumferential direction. However, the pressing portion 99 and the bottom-side recess portion 82 may be shaped so as to be long in the circumferential direction and short in the axial direction of the female member 41.

The average depth of the opening-side recess portion 81 is deeper than the average depth of the bottom-side recess portion 82. Therefore, the bottom-side recess portion 82 is deformed in the radial direction of the female member 41 by plastic deformation by a smaller deformation amount than the opening-side recess portion 81, and the pressing portion 99 is pushed in by a smaller amount than the joint portion 86.

The recess portion 76, which includes the above-described opening-side recess portion 81 and bottom-side recess portion 82, is formed at a plurality of positions equiangular in the circumferential direction of the female member 41. Therefore, the joint portion 86 and the pressing portion 99 are respectively formed at a plurality of positions equiangular in the circumferential direction of the female member 41. The opening-end recess portion 81 is formed at a plurality of positions equiangular in the circumferential direction of the female member 41, thereby forming a radially outwardly extending flange portion 108 at the end of the female member 41 closer to the opening portion 54, i.e., the opening end of the female member 41. Each of the recess portions 76 is formed so as to correspond to another recess portion 76 at a symmetrical position around the central axis of the female member 41, i.e., a position circumferentially different by 180 degrees.

Next, a manufacturing method for manufacturing the thus-configured shock absorber 11 will be described.

The female member 41 before the above-described swaging processing is performed thereon, i.e., the female member 41 having the connection cylinder portion 51 in a cylindrical state, the annular member 40, and the holding member 42 are integrally joined by welding to form the eye main body 21. Then, a coating process is performed on the eye main body 21 to coat the eye main body 21 with cation. Further, a coating process is also performed on the cylinder 12 with the eye main body 23 welded thereto to coat the cylinder 12 with cation. Further, a plating process is performed on the rod 14 to form a plating layer on an outer surface of the rod 14 with the annular groove 28 formed thereon.

The coating process for coating the eye main body 21 of the mounting eye 15, the coating process for coating the cylinder 12, and the plating process for plating the rod 14 as described above are respectively separately performed. After that, as described above, a joining process and a pressing process are simultaneously performed. The joining process includes inserting the male portion 27 of the rod 14 in the connection cylinder portion 51 of the eye main body 21 of the mounting eye 15, and pushing the joint portion 86 of the inner-side wall 85 into the annular groove 28 of the rod 14 by swaging the outer-side wall 75 of the connection cylinder portion 51 from the outside, thereby joining the rod 14 and the eye main body 21. The pressing process includes pressing a position of the inner-side wall 85 of the connection cylinder 51 corresponding to the fitted cylindrical surface portion 30, which is axially different from the annular groove 28, toward the rod 14. Further, the joining process and the pressing process are performed at a plurality of positions in the circumferential direction simultaneously.

In this way, the recess portion 76, which is constituted by the opening-side recess portion 81 and the bottom-side recess portion 82, is formed at a plurality of positions in the circumferential direction of the eye main body 21. As a result, the joint portion 86 inserted in the annular groove 28 of the rod 14, and the pressing portion 99 pressed against the fitted cylindrical surface portion 30 of the rod 14 are formed at a plurality of positions in the circumferential direction of the eye main body 21, thereby fixing the eye main body 21 to the rod 14. In other words, the joining process, in which the eye main body 21 and the rod 14 are joined to each other by pushing the joint portion 86 of the connection cylinder portion 51 into the annular groove 28 of the rod 14, is performed, thereby prohibiting an axial relative movement between the eye main body 21 and the rod 14. In addition, the pressing process, in which the pressing portion 99 is pressed against the fitted cylindrical portion 30 of the rod 14 at a position of the connection cylinder 51 axially different from the annular groove 28, is performed, thereby eliminating a space formed by the clearance fit to prevent the rod 14 from being inclined relative to the eye main body 21. Further, since the eye main body 21 is circumferentially partially pressed against the rod 14, a relative rotation is also prohibited therebetween. The joining process and the pressing process may be separately performed. In this case, after the joining process is performed so that the eye main body 21 is coupled to the rod 14 so as to prohibit an axial relative movement therebetween, the pressing process is performed so as to prohibit the rod 14 from being inclined relative to the eye main body 21.

Figure 5:
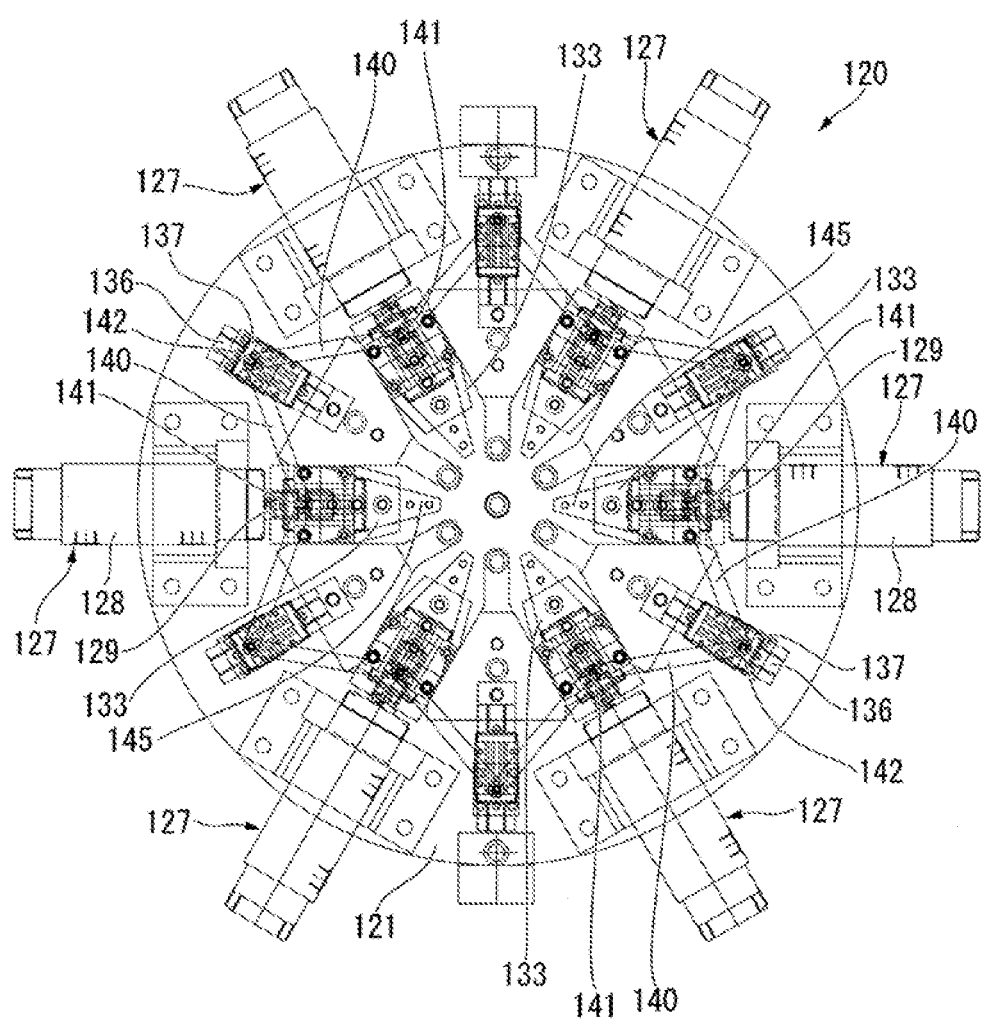
FIG. 5 is a planar view of a swaging processing apparatus used in the first embodiment of the present invention.
Figure 6:
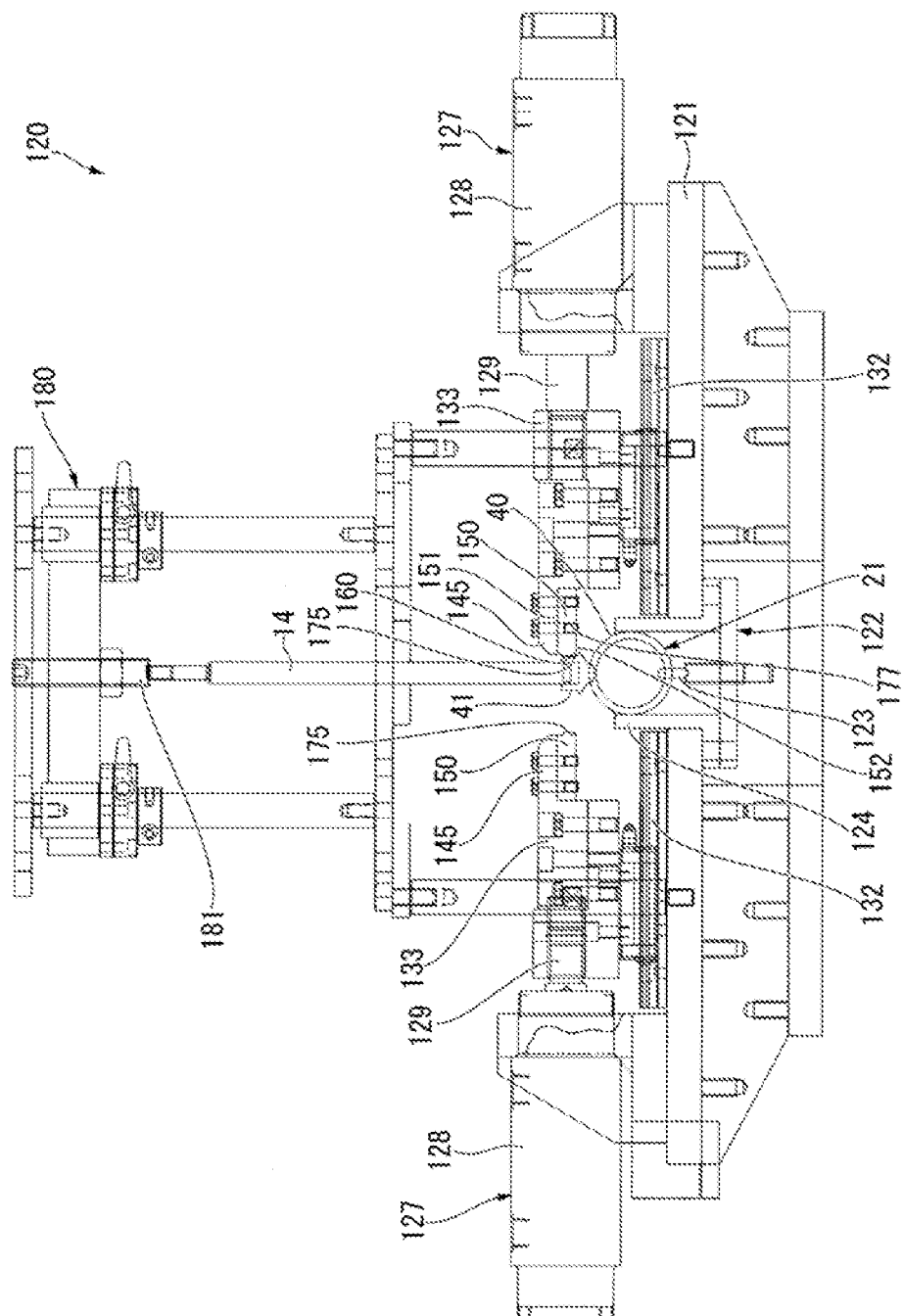
FIG. 6 is a front view of the swaging processing apparatus used in the first embodiment of the present invention.

The above-described joining process and pressing process are circumferentially simultaneously performed with use of a swaging processing apparatus 120 illustrated in FIGS. 5 and 6. This swaging processing apparatus 120 includes a disk-shaped circular table 121 as illustrated in FIG. 5, and a support table 122 disposed at a center of the table 121 for supporting the eye main body 21 at the annular member 40 thereof as illustrated in FIG. 6. This support table 122 includes a lower portion support portion 123, which supports the lower portion of the annular member 40 from below, and a cylindrical side portion support portion 124, which supports the both sides of the annular member 40 in the radial direction from the sides. The eye main body 21 is supported by the support table 122 in such a state that the annular member 40 faces downward while the female member 41 faces upward, whereby the central axis of the female member 41 can match the central axis of the table 121.

As illustrated in FIG. 5, a plurality of swaging cylinders 127, in particular, six swaging cylinders 127 are mounted at an outer circumferential side of the table 121 equiangularly in the circumferential direction of the table 121 around the central axis of the table 121. The swaging cylinder 127 includes a cylinder main body 128 fixed to the table 121, and a rod 129 that can enter or exit the cylinder main body 128. The swaging cylinder 127 is disposed in such a manner that the central axis of the rod 129 extends along the radial direction of the table 121, and the rod 129 can advance toward the center of the table 121. Further, as illustrated in FIG. 6, a slide rail 132 is fixed to the table 121 along the radial direction of the table 121 so as to connect the central axis of the table 121 and each swaging cylinder 127. A tool slider 133 is supported by the slide rail 132 so as to be movable by being guided by the slide rail 132, and the rod 129 of the swaging cylinder 127 is coupled with each tool slider 133.

As illustrated in FIG. 5, a slide rail 136 is fixed along the radial direction of the table 121 between the swaging cylinders 127 adjacent in the circumferential direction of the table 121. A synchronization slider 137 is supported by the slide rail 136 so as to be guided by the slide rail 136.

A link member 140 is disposed between the tool slider 133 coupled with the swaging cylinder 127 and the synchronization slider 137 adjacent thereto. The link member 140 has one end rotationally supported by a rotational shaft 141 of the tool slider 133, and the other end rotationally supported by a rotational shaft 142 of the synchronization slider 137. All of the tool sliders 133 are coupled to the synchronization sliders 137 adjacent thereto at the both sides thereof via the link members 140, whereby all of the tool sliders 133 are configured to slide in synchronization with one another. Referring to FIG. 6, the swaging cylinder 127 at the left side indicates the rod 129 in a state retracted in the cylinder 127, and the swaging cylinder 127 at the right side indicates the rod 129 in a state extended out of the cylinder 127.

A tool attachment portion 145 is formed at the tip side of the tool slider 133. A punch 150 illustrated in FIG. 7, which is a swaging tool, is fixed to the tool attachment portion 145. The punch 150 has a tapering shape in a planar view. The punch 150 includes an upper surface portion 151 and a lower surface portion 152 in parallel with each other, a back surface portion 153 connecting the back end edges of the upper surface portion 151 and the lower surface portion 152 perpendicularly to the upper surface portion 151 and the lower surface portion 152, a pair of parallel back portion side surface portions 154 forwardly extending from edges of both sides of the back surface portion 153 perpendicularly to the upper and lower surface portions 151 and 152 and the back surface portion 153, and a pair of front portion side surface portions 155 extending from the respective front edges of the back portion side surface portions 154 perpendicularly to the upper and lower surface portions 151 and 152 and obtusely relative to the back portion side surface portions 154 continuous from the back side surface portions 154. A distance between the pair of front portion side surface portions 155 reduces toward the opposite sides thereof from the pair of the back portion side surface portions 154.

Further, the punch 150 includes a tip surface portion 160 located at the opposite side from the back surface portion 153, extending perpendicularly to the upper and lower surface portions 151 and 152, and constituted by a cylindrical surface recessed backward. The tip surface portion 160 is disposed at a middle position between the upper and lower surface portions 151 and 152. The tip surface portion 160 is formed at a predetermined position in the direction connecting the upper and lower surface portions 151 and 152, keeping a constant width. The punch 150 includes an extending upper surface portion 161 backwardly and upwardly extending from the upper edge of the tip surface portion 160 toward the back surface portion 153, an upper front surface portion 162 extending from the back end edge of the extending upper surface portion 161 to the upper surface portion 151 perpendicularly to the upper surface portion 151, a pair of extending lower surface portions 163 backwardly and downwardly extending from both sides of the lower edge of the tip surface portion 160, a pair of lower front surface portions 164 extending from back end edges of the respective extending lower surface portions 163 to the lower surface portion 152 perpendicularly to the lower surface portion 152, a central front surface portion 165 extending from the center of the lower edge of the tip surface portion 160 to the lower surface portion 152, and a pair of front end side surface portions 166 extending from edges of both sides of the central front surface portion 165 to edges of inner sides of the pair of lower front surface portions 164 in parallel with the pair of back portion side surface portions 154. The central front surface portion 165 is offset from the tip surface portion 160 toward the back surface portion 153 as a whole.

As illustrated in FIG. 6, the above-described punch 150 is disposed in such a manner that the upper surface portion 151 and the lower surface portion 152 are horizontally at the upper side and the lower side, respectively. The punch 150 is fixed to the tool attachment portion 145 of the tool slider 133 in such a posture that the tip surface portion 160 is disposed at the central side of the table 121. Then, the above-described recess portion 76 is formed at the eye main body 21 illustrated in FIGS. 2 to 4 by a tip swaging portion 175 including the tip surface portion 160 illustrated in FIG. 7. More specifically, the punch 150 functions in the following manner. The tip surface portion 160 forms the bottom surface portion 90 of the opening-side recess portion 81 of the recess portion 76. The extending upper surface portion 161 forms the wall surface portion 91 of the opening-side recess portion 81. The extending lower surface portion 163 forms the wall surface portion 92 of the opening-side recess portion 81. The front portions of the pair of front portion side surface portions 155 form the pair of wall surface portions 93 of the opening-side recess portion 81. The pair of front end side surface portions 166 forms the pair of wall surface portions 102 of the bottom-side recess portion 82. The central front surface portion 165 forms the bottom surface portion 101 of the bottom-side recess portion 82.

The tip swaging portion 175 of the punch 150 includes the tip surface portion 160, the extending upper surface portion 161, the pair of extending lower surface portion 163, the front portions of the pair of front portion side surface portions 155, the pair of front end side surface portions 166, and the central front surface portion 165. The tip swaging portion 175 has a T shape as viewed from the front thereof. In other words, the tip of the punch 150 has a T shape. A plurality of attachment screw holes 177 is formed at the punch 150 perpendicularly to the upper and lower surface portions 151 and 152. The punch 150 is fixed to the tool attachment portion 145 of the swaging processing apparatus 120 illustrated in FIG. 5 at the attachment screw holes 177.

The above-described punches 150 are respectively fixed to the tool attachment portions 145 of the tool sliders 133 with the tip swaging portions 175 thereof facing the support table 122. As a result, the plurality of punches 150 is disposed at six positions equiangularly in the circumferential direction of the table 121, and therefore they become slidable in the radial direction of the table 121, respectively.

The rod 14 is inserted from above into the opening portion 54 of the female member 41 which opens in the upward direction of the eye main body 21 supported by the support table 122, and is fitted therein at the male portion 27. The swaging processing apparatus 120 includes a rod support mechanism 180 that vertically supports the rod 14 fitted in the eye main body 21 in this way. The rod support mechanism 180 supports an upper end of the rod 14 by a vertically movable rod support portion 181.

Figure 7A:
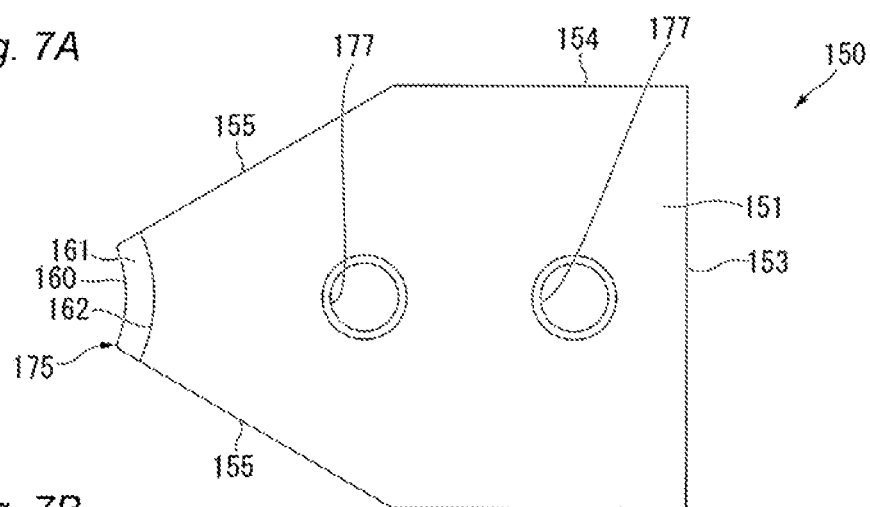
FIGS. 7A, 7B, and 7C illustrate a punch used in the first embodiment of the present invention, and in particular.
Figure 7B:
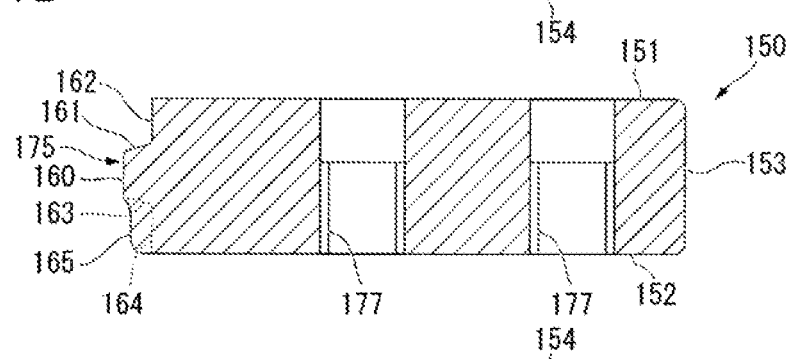
Figure 7C:
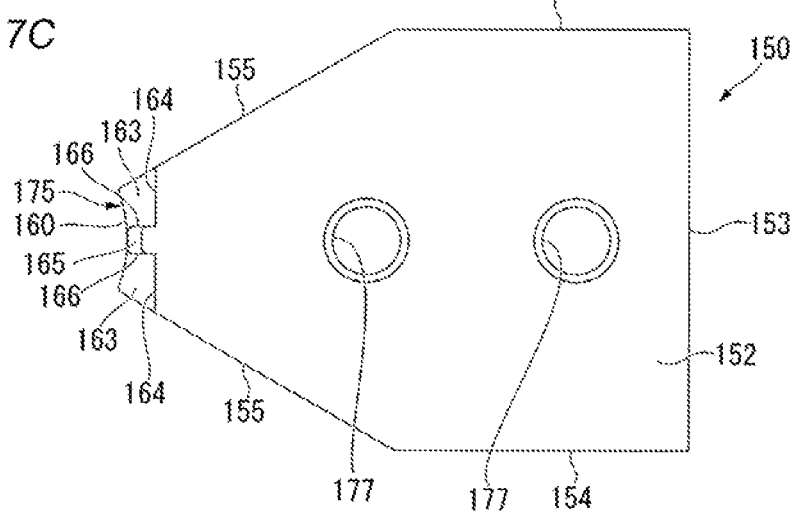

Then, the eye main body 21 is supported by the support table 122 of the above-described swaging processing apparatus 120. After the male portion 27 of the rod 14 is fitted in the female member 41 of the eye main body 21, the upper end of the rod 14 is supported by the rod support portion 181 of the rod support mechanism 180. As a result, the eye main body 21 and the rod 14 are set in such a state that they vertically extend, sharing a common central axis. In this state, a so-called shrinking process is performed in the following manner. When all of the swaging cylinders 127 are driven in this state, the swaging cylinders 127 are accurately synchronized with one another by the link members 140 and the synchronization sliders 137. The plurality of tool sliders 133 advances toward the eye main body 21. The plurality of punches 150 fixed to the tool sliders 133 move to abut at the tip swaging portions 175 against the female member 41 of the eye main body 21 from the radially outer side simultaneously, thereby radially inwardly pushing in the female member 41 at the attachment positions. At this time, the punch 150 illustrated in FIG. 7 is configured in such a manner that the central front surface portion 165, which forms the bottom surface portion 101 of the bottom-side recess portion 82 illustrated in FIGS. 2 to 4, is overall backwardly offset relative t to the tip surface portion 160, which forms the bottom surface portion 90 of the opening-side recess portion 81. Therefore, the inner portion of the female member 41 corresponding to the bottom-side recess portion 82 is deformed in the radial direction by a smaller amount than the inner portion of the female member 41 corresponding to the opening-side recess portion 81, as a result of which, the pressing portion 99 is pressed by a smaller amount than the joint portion 86.

In this way, the recess portion 76, which is constituted by the opening-side recess portion 81 and the bottom-side recess portion 82 illustrated in FIGS. 2 to 4, is formed at six positions equiangular in the circumferential direction of the eye main body 21. As a result, the joint portions 86 inserted in the annular groove 28 of the rod 14, and the pressing portions 99 pressed against the fitted cylindrical surface portion 30 of the rod 14 are formed at the six positions equiangular in the circumferential direction of the eye main body 21, thereby fixing the eye main body 21 to the rod 14. In this way, a jointed body 182, which is formed by fixing the eye main body 21 to the rod 14, is acquired.

Figure 8:
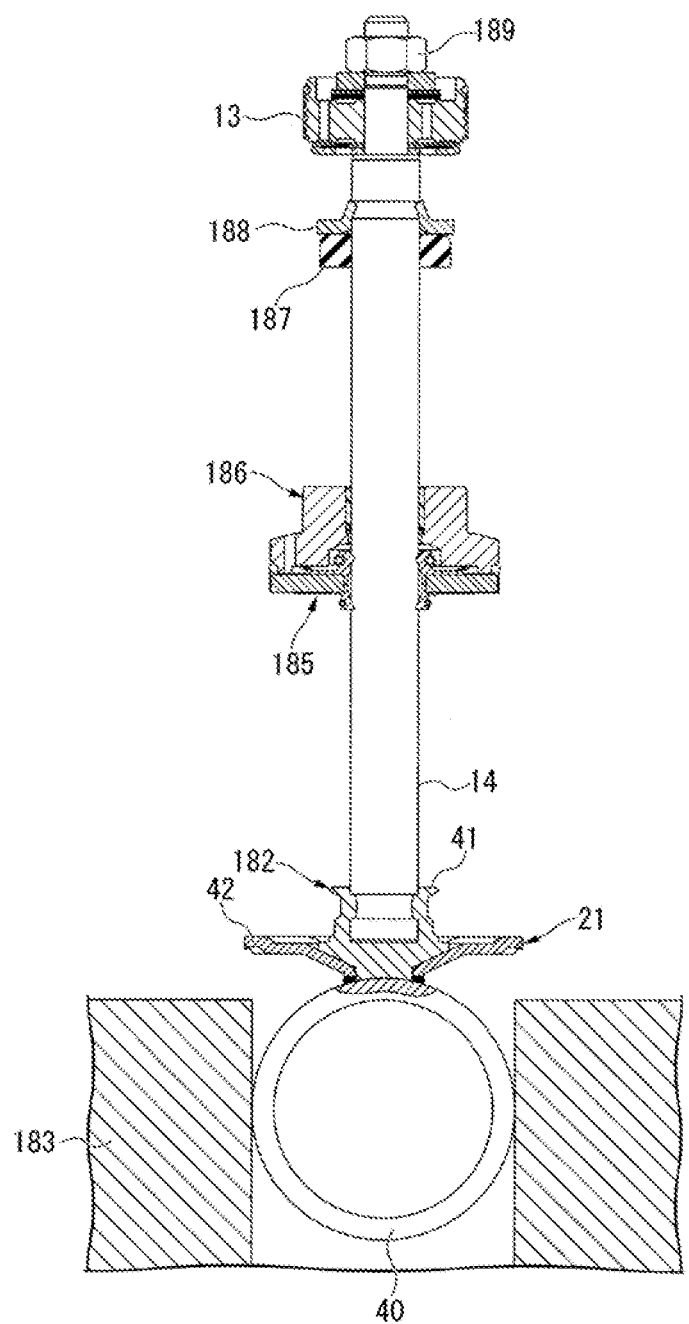
FIG. 8 is a partially sectioned front view illustrating a manufacturing process according to the first embodiment of the present invention.

After the above-described joining process and pressing process are simultaneously performed, the joined body 182 acquired from these processes is assembled to the cylinder 12 illustrated in FIG. 1. At this time, for example, as illustrated in FIG. 8, the joined body 182 is placed with the eye main body 21 down and the annular member 40 fixed to a support jig 183. Then, an oil seal 185, a rod guide 186, and a buffer member 187 are mounted to the rod 14 of the joined body 182 from the opposite end from the eye main body 21, and a retainer 188 is fixed to the rod 14. After that, a piston 13 is fixed to the opposite end from the eye main body 21 of the rod 14 by a nut 189. The joined body 182 with the oil seal 185, the rod guide 186, the buffer member 187, the retainer 188, the piston 13, and the nut 189 attached thereto in this way is inserted in and attached to the cylinder 12 illustrated in FIG. 1.

Figure 9:
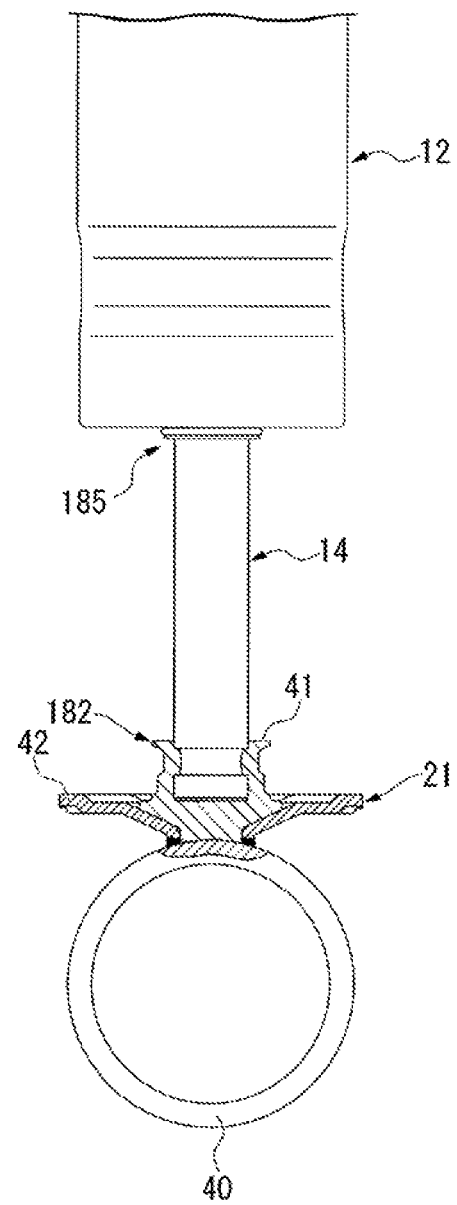
FIG. 9 is a partially sectioned front view illustrating another example of a manufacturing process according to the first embodiment of the present invention.

Alternatively, as illustrated in FIG. 9, the rod 14 before the above described joining process and pressing process, i.e., the rod 14 before the eye main body 21 is attached thereto may be assembled to the cylinder 12, and after that, the above-described joining and pressing processes may be performed to join the eye main body 21 to the rod 14 to acquire the joined body 182.

The invention disclosed in Japanese Patent Public Disclosure No. 2008-55483 discussed in Related Art is configured in such a manner that a plurality of annular grooves is formed at a male portion, and clinch portions are respectively pushed in the annular grooves to join the male portion to a female portion, thereby deteriorating the stiffness of the female portion. Therefore, a further improvement is demanded in terms of the product quality. Further, this invention requires formation of a plurality of annular grooves, and formation of clinch portions in a staggered arrangement, resulting in an increase in a time required for processing. Further, the necessity of formation of the plurality of annular grooves leads to a problem of an increase in the axial length of a connection portion.

On the other hand, according to the above-described first exemplary embodiment, the male portion 27 of the rod 14 (the second member), which has the single annular groove 28 formed around the outer circumference thereof, is fitted in the connection cylinder portion 51 (the first member) of the female member 41 of the eye main body 21. Then, during the joining process, the plurality of joint portions 86, which is joined by being pushed in the annular groove 28, is circumferentially formed on the inner-side wall 85 of the connection cylinder portion 51 of the female member 41. Further, during the pressing process, the pressing portion 99, which is pressed against the fitted cylindrical surface portion 30 of the male portion 27, is formed on the inner-side wall 85 of the connection cylinder portion 51 of the female member 41 so as to face the position axially different from the annular groove 28. Therefore, the female member 41 of the eye main body 21 can be joined to the rod 14 by the joint portions 86 while ensuring the stiffness against an input in the axial direction from the rod 14. In addition, the female member 41 of the eye main body 21 can be pressed against the rod 14 at the axially different positions of the joint portion 86 and the pressing portion 99, whereby it is possible to prevent the rod 14 from being inclined relative to the eye main body 21. Therefore, it is possible to maintain an appropriate joined state of the rod 14 to the eye main body 21, therefore possible to improve the quality of the joined body 182, i.e., the quality of the shock absorber 11. More specifically, it is possible to ensure the stiffness against a moment input, a vibration, and a repeated input from the rod 14. In addition, due to the formation of the pressing portion 99, which is pressed against the fitted cylindrical surface portion 30 of the male portion 27 of the rod 14, on the inner-side wall 85 of the connection cylinder portion 51 of the female member 41 at the position axially different from the annular groove 28, it is possible to prevent a reduction in the stiffness of the female member 41, i.e., the eye main body 21, leading to improvement of the quality in this term.

Further, the pressing portion 99 is formed continuously with the joint portion 86, so it is possible to press the connection cylinder portion 51 of the female member 41 of the eye main body 21 against a wider range of the rod 14 with the pressing portion 99, whereby it is possible to further securely prevent the rod 14 from being inclined relative to the eye main body 21. Therefore, it is possible to further securely maintain an appropriate joined state of the rod 14 to the eye main body 21. Further, since the pressing portion 99 and the joint portion 86 are continuously formed, this makes simultaneous formation of these portions easier. Therefore, it is possible to reduce a time required to join the eye main body 21 and the rod 14. Alternatively, the pressing portion 99 does not have to be formed continuously with the joint portion 86. In other words, the pressing portion 99 may be spaced apart from the joint portion 86. In this case, quality management becomes easier if the pressing portion 99 and the joint portion 86 are separately formed.

Further, the joint portion 86 has a shape short in the axial direction and long in the circumferential direction of the female member 41, it is possible to improve the stiffness by the joint portion 86 and enhance the durability.

Further, the pressing portion 99 has a shape short in the circumferential direction and long in the axial direction of the female member 41, so it is possible to effectively prevent an inclination of the rod 14. However, the pressing portion 99 may be shaped so as to be long in the circumferential direction and short in the axial direction of the female member 41.

Figure 10:
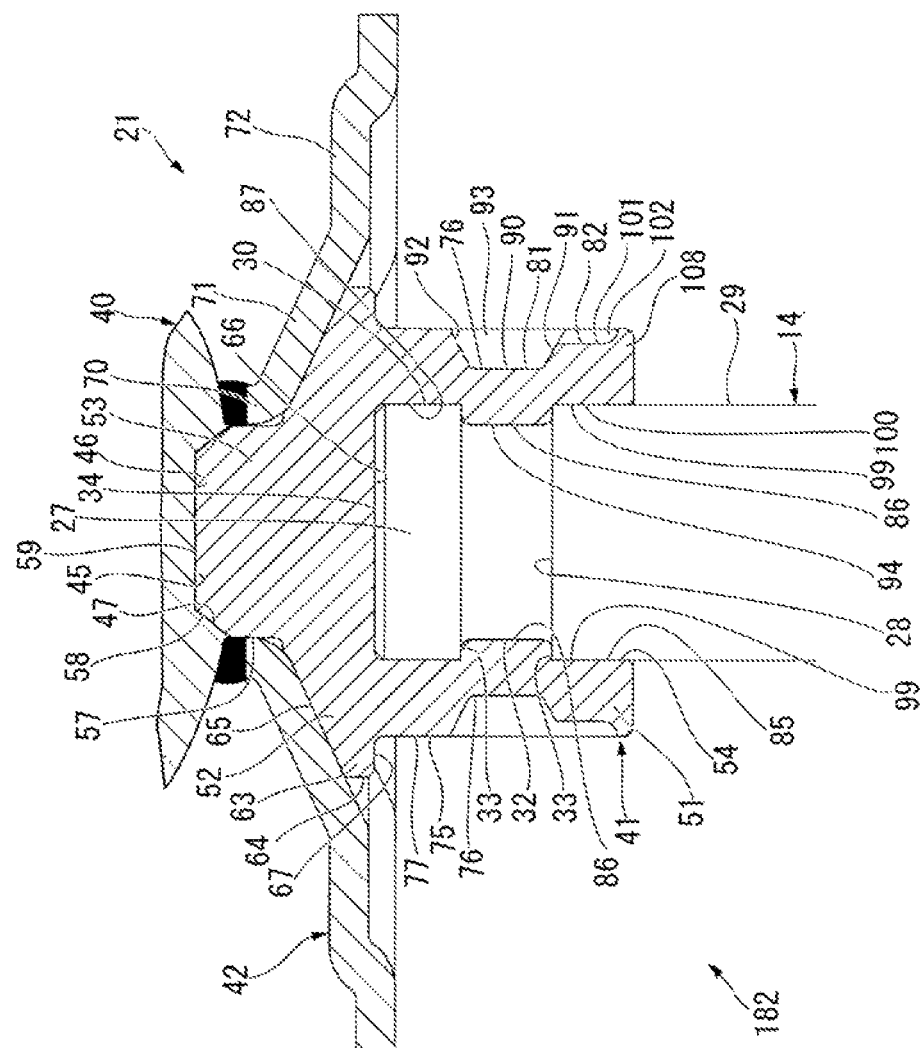
FIG. 10 is a cross-sectional view illustrating main parts of a variation of the first embodiment of the present invention as viewed from the front thereof.

Further, the pressing portion 99 is formed from the joint portion 86 in the direction toward one end closer to the male member 27 in the axial direction of the rod 14 (the direction toward the abutment tip surface portion 34, the end closer to the insertion-side end of the rod 14). Therefore, the joint portion 86, which is pushed in the annular groove 28, is joined at a position away from the tip of the rod 14. Accordingly, it is possible to further securely prevent an inclination of the rod 14 relative to the eye main body 21. Therefore, it is possible to further securely maintain an appropriate joined state of the rod 14 to the eye main body 21. Alternatively, as illustrated in FIG. 10, the pressing portion 99 and the recess portion 82 for forming the pressing portion 99 may be formed from the joint portion 86 and the recess portion 81 for forming the joint portion 86 in the direction toward the other end corresponding to the opposite end from the male portion 27 in the axial direction of the rod 14 (the opposite direction from the abutment tip surface portion 34, the opposite end from the insertion-side end of the rod 14). In this case, it is possible to prevent a reduction in the stiffness of the connection cylinder portion 51 of the female member 41 against a force applied in the direction for inclining the rod 14. Further alternatively, the pressing portion 99 and the recess portion 82 for forming the pressing portion 99 may be formed from the joint portion 86 and the recess portion 81 for forming the joint portion 86 in both the direction toward the one end and the direction toward the other end in the axial direction of the rod 14. Also in this case, the pressing portion 99 may have a shape short in the circumferential direction and long in the axial direction of the female member 41, or a shape long in the circumferential direction and short in the axial direction of the female member 41. Further, the recessed portion 81 and the recessed portion 82 may be spaced apart, although the workability is reduced.

Further, since pressing portion 99 is pushed in by a smaller amount than the joint portion 86, it is possible to prevent a reduction in the stiffness of the connection cylinder portion 51 of the female member 41.

Further, since the flange portion 108 is formed at the opening end of the female member 41, it is possible to improve the strength of the opening end of the female member 41, which may receive a moment due to an inclination of the rod 14.

Further, the coating process for coating the eye main body 21 of the mounting eye 15, the coating process for coating the cylinder 12, and the plating process for plating the rod 14 are respectively performed. After that, the rod 14 is inserted in the connection cylinder portion 51 of the eye main body 21, and the rod 14 and the eye main body 21 are joined to each other by pushing the inner-side wall 85 of the connection cylinder portion 51 into the annular groove 28, thereby performing the joining process. Therefore, the plated layer of the rod 14 is not affected by the coating process (especially, not affected by heat), whereby it is possible to ensure an excellent quality of the plating. Therefore, it is possible to improve the quality. More specifically, in a case where the rod 14 is welded to the eye main body 21, the coating process should be performed after the welding. Therefore, during a drying process after the coating, the rod 14, together with the eye main body 21, is placed in a drying oven. At this time, an entry of heat from the drying oven deteriorates the quality of the plating, thereby reducing the corrosion resistance. On the other hand, according to the embodiment of the present invention, the rod 14 can be joined to the eye main body 21 without being welded thereto, whereby the eye main body 21 alone can be coated before the rod 14 is joined to the eye main body 21, and the rod 14 is not placed in a drying oven, so it is possible to ensure an excellent quality of the plating of the rod 14, i.e., improve the anticorrosive characteristic of the plating of the rod 14. Further, welding can be omitted, whereby it is possible to prevent occurrence of, for example, a sputter and a burr from welding that adversely affect the sliding portion of the rod 14, thereby improving the quality in this term. Further, the necessity of welding is eliminated, which makes it possible to use a high-carbon steel such as S45C as a material of the rod 14, enabling improvement of the surface hardness, the strength under the neck, and the tensile strength of the rod 14. Improving the surface hardness of the rod 14 is effective in preventing the sliding surface from being damaged.

Further, the rod 14 is assembled to the cylinder 12 after the joining process. This means that there is no cylinder 12 during the joining process, so the cylinder 12 does not become an obstacle, thereby facilitating the joining process. Alternatively, in a case where the rod 14 is assembled with the cylinder 12 before the joining process, assembling of the rod 14 to the cylinder 12 can be freed from a limitation from the eye main body 21, and this assembling work can become easier. In this way, the number of choices about the order of the assembling processes increases, enhancing flexibility in the manufacturing processes.

Further, the coating process employs cation coating, which is especially high in the drying temperature when the coating is dried. Therefore, it is possible to further increase the effect of preventing a reduction in the quality of the plating, i.e., improving the anticorrosive characteristic of the plating by omitting putting the rod 14 in the drying oven. For improving the anticorrosive characteristic, it is necessary to increase the drying temperature. Therefore, this effect can be acquired by not only the cation coating but also any coating that increases the temperature at the time of drying.

Further, the joining process and the pressing process are simultaneously performed, so it is possible to reduce the time required for these processes.

Further, the punch 150, which simultaneously performs the joining process and the pressing process, has a T shape as the tip shape thereof. Therefore, the joint portion 86 can be formed into a wide shape and the pressing portion 99 can be formed into a narrow shape. Therefore, it is possible to effectively form the joint portion 86 and the pressing portion 99 while preventing a reduction in the stiffness of the eye main body 21. Further, it is possible to reduce the number of annular groove 28, so it is possible to reduce the processing time, and possible to reduce the axial dimension. The present embodiment includes only one annular groove, but may include two annular grooves.

[Second Embodiment]

Next, a second embodiment will be described mainly with reference to FIG. 11, focusing on a difference from the first embodiment. Similar members and portions to the first embodiment will be indicated by the same names and reference numerals.

According to the second embodiment, as illustrated in FIG. 11, a counter boring 200 is formed at the groove bottom surface portion 32 of the annular groove 28 of the rod 14 so as to be recessed beyond the groove bottom surface portion 32 by cutting processing. The counter boring 200 is formed along the radial direction of the rod 14, and is formed at one or more positions, in particular, two positions different by 180 degrees. As a result, unevenness, which is constituted by recesses defined by the counter borings 200 and protrusions defined between the counter borings 200, is formed inside the annular groove 28.

Thus-configured rod 14 is attached to the eye main body 21 by the above-described swaging processing apparatus 120. At this time, the male portion 27 of the rod 14 is inserted in the eye main body 21 while arranging the phases in such a manner that the above-described two counter borings 200 are situated on a line connecting any two punches 150 disposed at positions different by 180 degrees, among the six punches 150 of the swaging processing apparatus 120.

Then, during the joining process, six joint portions 86 are formed at the female member 41 of the eye main body 21 by the six punches 150. As a result, as illustrated in FIG. 11A, protrusion portions 201, which enter the counter borings 200, are formed at the two joint portions 86 formed by swaging processing with use of the above-described two punches 150 so as to protrude beyond the abutment surface portion 94 in contact with the groove bottom surface portion 32 of the annular groove 28 of the rod 14.

According to the above-described second embodiment, since the unevenness is formed inside the annular groove 28, the protrusion portion 201 of the joint portion 86 can enter the recessed counter boring 200 as described above. Therefore, it is possible to increase the strength against a torque of a relative rotation and therefore improve a rotation-prevention effect for prohibiting a relative rotation, compared to the first embodiment, which prohibits a relative rotation between the rod 14 and the eye main body 21 only by a contact pressure. As a result, for example, as illustrated in FIG. 8, when the nut 189 is fastened in a state prohibiting a rotation of the eye main body 21 after the eye main body 21 is fixed to the rod 14, it is possible to fasten the nut by a higher torque. Unevenness may be formed on at least one of the pair of groove wall surface portions 33 in the annular groove 28, and the unevenness at the groove bottom surface portion 32 may be added thereto.

[Third Embodiment]

Next, a third embodiment will be described mainly with reference to FIGS. 12 to 14, focusing a difference from the second embodiment. Similar members and portions to the second embodiment will be indicated by the same names and reference numerals.

According to the third embodiment, as illustrated in FIG. 12, the counter boring 200 in the second embodiment is replaced with a serration groove 210. The serration groove 210 is formed at the groove bottom surface portion 32 of the annular groove 28 of the rod 14 by rolling. A large number of serration grooves 210 are formed equiangularly in the circumferential direction of the rod 14. As a result, unevenness, which is consisted by recesses defined by the serration grooves 210 and protrusions defined between adjacent serration grooves 210, is formed inside the annular groove 28.

The thus-configured rod 14 is attached to the eye main body 21 by the above-described swaging processing apparatus 120. At this time, the phase adjustment is unnecessary unlike the second embodiment, and the male portion 27 of the rod 14 is inserted in the eye main body 21 at an arbitrary angle.

Then, during the joining process, the six joint portions 86 are formed at the female member 41 of the eye main body 21 by the six punches 150. Then, as illustrated in FIG. 12A, protrusion portions 211, which enter the serration grooves 210, are formed at the joint portions 86 formed by the swaging processing with use of the punches 150. Although the rod 14 may be in any phase relative to the eye main body 21, the arrangement and interval of the serration grooves 210 are set in such a manner that at least one protrusion portion 211 is necessarily formed at every joint portion 86.

According to the above described third embodiment, since the unevenness is formed inside the annular groove 28, the protrusion portions 211 of the joint portions 86 can be inserted in the recessed serration grooves 210 as described above. Therefore, the third embodiment can provide a similar effect to the second embodiment. In addition, since the grooves 210 are serration grooves, it is possible to improve manufacturing efficiency. Further, it is possible to form a large number of recesses at narrow arrangement intervals, thereby eliminating the necessity of considering the phase of the rod 14 relative to the eye main body 21 as described above. Therefore, it is possible to improve work efficiency at the time of manufacturing. Also in this case, unevenness may be formed on at least one of the pair of groove wail surface portions 33 in the annular groove 28. The unevenness of the groove bottom surface portions 32 may be added thereto.

Figure 13:
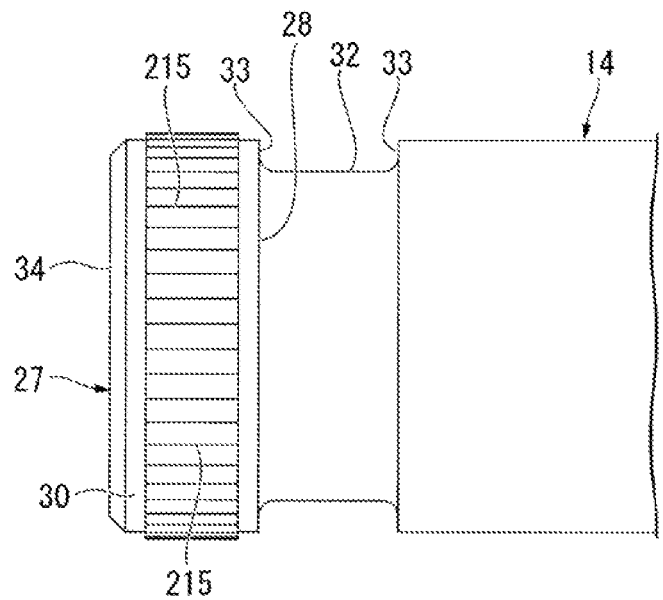
FIG. 13 is a front view illustrating main parts of a variation of a rod according to the third embodiment of the present invention.

Alternatively, as illustrated in FIG. 13, serration grooves 215 may be formed at the portion of the fitted cylindrical surface portion 30 except for the annular groove 28 of the male portion 27 of the rod 14 at the side closer to the abutment tip surface portion 34 relative to the annular groove 28. In this case, during the pressing process, protrusion portions are formed at the pressing portion 99 of the eye main body 21 so as to protrude beyond the abutment surface portion 100 and enter the serration grooves 215. According to this configuration, it is possible to prevent a reduction in the strength of the rod 14. In this case, instead of the serration grooves 215, counter borings, like the second embodiment, may be formed at the portion of the fitted cylindrical surface portion 30 closer to the abutment tip surface portion 34 relative to the annular groove 28.

Figure 14:
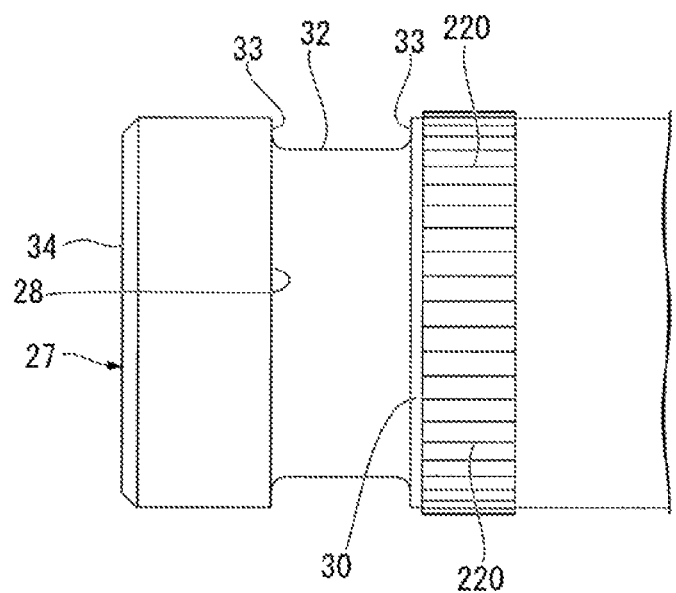
FIG. 14 is a front view illustrating main parts of another variation of the rod according to the third embodiment of the present invention.

Further, as illustrated in FIG. 14, serration grooves 220 may be formed at the portion of the fitted cylindrical surface portion 30 except for the annular groove 28 of the male portion 27 of the rod 14 at the opposite side of the annular groove 28 from the abutment tip surface portion 34. In this case, during the pressing process, as illustrated in FIG. 10, the pressing portion 99 (the recessed portion 82) is formed at the opposite side of the joint portion 86 from the abutment tip surface portion 34 in the axial direction of the rod 14. As a result, protrusion portions are formed at the pressing portion 99 of the eye main body 21 so as to protrude beyond the abutment surface portion 100 and enter the serration grooves 22. Also in this case, instead of the serration grooves 215, counter borings, like the second embodiment, may be formed at the opposite portion of the fitted cylindrical surface portion 30 from the abutment tip surface portion 34 relative to the annular groove 28.

According to the above-described embodiments, a joined body includes a first member (the eye main body 21 in the above-described embodiments) having a female portion, and a second member (the rod 14 in the above-described embodiments) having a male portion inserted in the female portion at one end and an annular groove along an outer circumference of the male portion, and fitted to the first member. In this joined body, a plurality of joint portions is formed on a side wall of the female portion. The joint portions are joined by being pushed in the annular groove. A pressing portion is formed at the female portion so as to face a position of the male portion axially different from the annular groove. The pressing portion is pressed against the male portion. Therefore, it is possible to join the male portion of the first member to the second member so as to ensure the stiffness against an input in an axial direction of the second member by the joint portions. Further, since it is possible to press the female portion against the second member at axially different positions of the joined portions and the pressing portion, it is possible to prevent the second member from being inclined relative to the first member. Therefore, it is possible to maintain an appropriate joined state of the second member to the first member, and therefore possible to improve the quality. Further, since the pressing portion, which is pressed against the male portion, is formed so as to face the position axially different from the annular groove of the female portion, it is possible to prevent a reduction in the stiffness of the female portion.

Further, the pressing portion is formed continuously with the joint portion. Therefore, it is possible to press the female portion of the first member against a wider range of the second member with the pressing portion in addition to the joint portion, whereby it is possible to further securely prevent the second member from being inclined relative to the first member. Therefore, it is possible to further securely maintain an appropriate joined state of the second member to the first member.

Further, in a case where the pressing portion is formed from the joint portion in a direction toward an insertion-side end of the second member, this means that the joint portion, which is pushed in the annular groove, is joined at a position away from a tip of the second member. Therefore, it is possible to further securely prevent the second member from being inclined relative to the first member. Therefore, it is possible to further securely maintain an appropriate joined state of the second member to the first member.

Further, in a case where the pressing portion is formed from the joint portion in a direction toward an opposite end from the insertion-side end of the second member, it is possible to prevent a reduction in the stiffness of the female member of the first member against a force applied in a direction for inclining the second member.

Further, in a case where the pressing portion is pushed in by a smaller amount than the joint portion, it is possible to prevent a reduction in the stiffness of the connection cylinder portion of the female member.

Further, in a case where unevenness is formed inside the annular groove, it is possible to prohibit a relative rotation between the first member and the second member by inserting the joint portion in a recessed portion of the unevenness.

Further, in a case where unevenness is formed at a portion of the male portion except for the annular groove of the male portion and where the first member and the second member are fitted, it is possible to further securely prevent a reduction in the strength of the second member.

Further, in a case where a flange portion is formed at an opening end of the female portion of the first member, it is possible to improve the strength of the opening end of the female portion, which may receive a moment due to an inclination of the second member.

Further, a shock absorber includes a cylinder sealingly containing hydraulic fluid, a piston inserted in the cylinder a rod having one end coupled to the piston and the other end extending to an outside of the cylinder, and a mounting eye attached to the other end of the rod. The mounting eye includes a connection cylinder portion in which the other end of the rod is inserted. An annular groove is formed at a portion of the other end of the rod that is inserted in the connection cylinder portion. A plurality of joint portions is formed on a side wall of the connection cylinder portion, and the joint portions are joined by being pushed in the annular groove. A pressing portion is formed at the side wall of the connection cylinder portion so as to face a position of the rod axially different from the annular groove, and the pressing portion is pressed against the rod. Therefore, it is possible to join the mounting eye to the rod with the joint portions so as to ensure the rigidity against an input in an axial direction of the rod by the joint portions of the mounting eye. In addition, the mounting eye can be pressed against the rod at the axially different positions of the joint portion and the pressing portion, whereby it is possible to prevent the rod from being inclined relative to the mounting eye. Therefore, it is possible to maintain an appropriate joined state of the rod to the mounting eye, therefore possible to improve the quality of the shock absorber. In addition, due to the formation of the pressing portion, which is pressed against the rod, on the connection cylinder portion of the mounting eye at the position axially different from the annular groove of the side wall of the rod, it is possible to prevent a reduction in the stiffness of the mounting eye, leading to improvement of the quality of the shock absorber in this term.

Further, the present invention is a method for manufacturing a shock absorber. The shock absorber includes a cylinder sealingly containing hydraulic fluid, a piston inserted in the cylinder, a rod having one end coupled to the piston and the other end extending to an outside of the cylinder, and a mounting eye attached to the other end of the rod. The mounting eye includes a connection cylinder portion in which the other end of the rod is inserted. An annular groove is formed at a portion of the other end of the rod that is inserted in the connection cylinder portion. The plurality of joint portions is formed on a side wall of the connection cylinder portion, and the joint portions are joined by being pushed in the annular groove. The method for manufacturing the shock absorber includes coating the mounting eye, coating the cylinder, plating the rod, and after performing each of them, joining the mounting eye and the rod by inserting the rod in the connection cylinder portion of the mounting eye and pushing the side wall of the connection cylinder portion in the annular groove. According to this method, the plated layer of the rod is not affected by the coating process, whereby it is possible to ensure a quality of the plated layer. Therefore, it is possible to improve the quality of the shock absorber.

Further, in the above-described manufacturing method, in a case where the rod is assembled with the cylinder after the joining, this means that there is no cylinder during the joining process, thereby facilitating the joining process.

Further, in the above-described manufacturing method, in a case where the rod is assembled with the cylinder before the joining, assembling of the rod to the cylinder can be freed from a limitation from the mounting eye, and therefore this assembling work can become easier.

Further, in the above-described manufacturing method, in a case where the coating includes cation coating in which a temperature is high at the time of drying, it is possible to enhance the effect in preventing a reduction in the quality of the plated layer, which might be otherwise caused by a high temperature at the time of drying.

Further, in a case where the above-described manufacturing method further includes pressing a position of the side wall of the connection cylinder portion axially different from the annular groove toward the rod, it is possible to prohibit the rod from being inclined relative to the mounting eye.

Further, in the above-described manufacturing, in a case where the joining and the pressing are simultaneously performed, it is possible to reduce a time required for joining and pressing.

Further, in the above-described manufacturing, in a case where the joining and pressing include disposing a plurality of punches in a circumferential direction and pushing the punches in a radial direction, and each of the punches has a T shape as a tip shape thereof to form a wider width portion and a narrower width portion, it is possible to effectively perform the joining and the pressing while preventing a reduction in the stiffness of the mounting eye.

Further, according to the embodiments of the present invention, it is possible to improve the workability of the joined body.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2011-236639 filed on Dec. 27, 2011. The entire disclosure of No. 2011-286639 filed on Dec. 27, 2011 including specification, claims, drawings and summary is incorporated herein by reference in its entirety.

What is claimed is:

1. A joined body comprising:
   a first member having a female portion;
   a second member having a male portion inserted in the female portion at one end, an annular groove along an outer circumference of the male portion, and a fitted portion continuous from the annular groove in the axial direction of the second member and having a larger diameter than a groove bottom surface portion of the annular groove, the second member being fitted to the first member,
   wherein a plurality of first recess portions is formed on an outer circumferential surface of a side wall of the female portion, and a plurality of joint portions is formed on an inner circumferential surface of the side wall of the female portion at positions of the first recess portions, and the joint portions are received in the annular groove of the male portion, the plurality of the first recess portions and the plurality of the joint portions being formed at a plurality of positions in a circumferential direction of the female portion, and
   wherein the female portion includes a plurality of second recess portions formed on the outer circumferential surface of the side wall of the female portion at positions axially different from the first recess portions, and a plurality of pressing portions protruding radially inwardly to engage the fitted portion, the plurality of the second recess portions and the plurality of the pressing portions being formed at a plurality of positions in the circumferential direction of the female portion,
   wherein the second recess portions are open to the first recess portions, and the pressing portions are formed continuously with the joint portions.

2. The joined body according to claim 1, wherein each of the pressing portions extends from the joint portion in a direction toward an insertion-side end of the male portion.

3. The joined body according to claim 1, wherein each of the pressing portions is formed from the joint portion in a direction toward an opposite end from an insertion-side end of the male portion.

4. The joined body according to claim 1, wherein each of the pressing portions is pushed in by a smaller amount than the joint portion.

5. The joined body according to claim 1, wherein unevenness is formed in the annular groove of the male portion.

6. The joined body according to claim 1, wherein unevenness is formed at a portion of the male portion except for the annular groove where the male portion is fitted to the female portion.

7. The joined body according to claim 1, wherein a flange portion is formed at an opening end of the female portion.

8. A shock absorber employing the joined body according to claim 1, comprising:
- a cylinder sealingly containing hydraulic fluid;
- a piston inserted in the cylinder;
- a rod as the second member, having one end coupled to the piston, and the other end extending to an outside of the cylinder; and
- a mounting eye as the first member, attached to the other end of the rod,
- wherein the mounting eye includes a connection cylinder portion as the female portion, in which the other end of the rod is inserted,
- an annular groove is formed at the male portion of the other end of the rod that is inserted in the connection cylinder portion,
- a plurality of joint portions is formed on an inner circumferential surface of a side wall of the connection cylinder portion, the joint portions being joined to the rod by being received in the annular groove, and a plurality of pressing portions is formed continuously with the joint portions on the inner circumferential surface of the side wall of the connection cylinder portion.

9. The joined body according to claim 1, wherein the circumferential length of the pressing portions is shorter than that of the joining portions, and
- the pressing portions are in contact with an end of the fitted portion that is closer to the annular groove while applying a pressing force.

10. A method for manufacturing a shock absorber including
- a cylinder sealingly containing hydraulic fluid,
- a piston inserted in the cylinder,
- a rod having one end coupled to the piston, and the other end extending to an outside of the cylinder, and
- a mounting eye attached to the other end of the rod,
- wherein the mounting eye includes a connection cylinder portion in which the other end of the rod is inserted,
- an annular groove is formed at an portion of the other end of the rod that is inserted in the connection cylinder portion, and
- a plurality of joint portions is formed on a side wall of the connection cylinder portion, the joint portions being joined to the male portion by being pushed in the annular groove,
- the method for manufacturing the shock absorber, comprising:
- joining the mounting eye and the rod by inserting the rod in the connection cylinder portion of the mounting eye and pushing the side wall of the connection cylinder portion in the annular groove after coating of the mounting eye, coating of the cylinder, and plating of the rod.

11. The method for manufacturing the shock absorber according to claim 10, further comprising assembling the rod to the cylinder after the joining.

12. The method for manufacturing the shock absorber according to claim 10, further comprising assembling the rod to the cylinder before the joining.

13. The method for manufacturing the shock absorber according to claim 10, wherein the coating includes cation coating.

14. The method for manufacturing the shock absorber according to claim 10, further comprising pressing a position of the side wall of the connection cylinder portion axially different from the annular groove toward the rod.

15. The method for manufacturing the shock absorber according to claim 14, wherein the joining and the pressing are performed simultaneously.

16. The method for manufacturing the shock absorber according to claim 15, wherein the joining and pressing comprise disposing a plurality of punches in a circumferential direction and pushing the punches in a radial direction, each of the punches having a T shape as a tip shape thereof.

17. The method for manufacturing the shock absorber according to claim 14, wherein the pressing portions formed in the pressing step are formed continuously with the joint portions formed in the joining step, and
- wherein the pressing portions are in contact with an end of the fitted portion that is closer to the annular groove while applying a pressing force.

18. A method for manufacturing a shock absorber including
- a cylinder sealingly containing hydraulic fluid,
- a piston inserted in the cylinder,
- a rod having one end coupled to the piston, and the other end extending to an outside of the cylinder, and
- a mounting eye attached to the other end of the rod,
- wherein the mounting eye includes a connection cylinder portion in which the other end of the rod is inserted,
- an annular groove is formed at portion of the other end of the rod that is inserted in the connection cylinder portion,
- a fitted portion having a larger diameter than a groove bottom surface portion of the annular groove is formed continuously with the annular groove in an axial direction of the rod, and
- a plurality of joint portions is formed on a side wall of the connection cylinder portion,
- the method for manufacturing the shock absorber, comprising:
- joining the mounting eye and the rod by inserting the rod in the connection cylinder portion of the mounting eye and pushing the side wall of the connection cylinder portion in the annular groove at a first position of the side wall to form a plurality of first recess portions on an outer surface of the connection cylinder portion and the plurality of the joint portions on an inner surface of the connection cylinder portion, the plurality of the first recess portions and the plurality of the joint portions being formed at a plurality of positions in a circumferential direction of the connection cylinder portion; and
- pressing a plurality of portions of the side wall of the connection cylinder portion, at a second position that is axially different from the first position, toward the rod to form a plurality of second recess portions on the outer surface of the connection cylinder portion and a plurality of pressing portions on the inner surface of the connection cylinder portion, the plurality of the second recess portions and the plurality of the pressing portions being formed at a plurality of positions in the circumferential direction of the connection cylinder portion, wherein the second recess portions are open to the first recess portions, and the pressing portions are formed continuously with the joint portions, the pressing portions projecting radially inwardly to be pressed against the fitted portion.

19. The method for manufacturing the shock absorber according to claim 18, wherein the joining and the pressing steps are performed simultaneously.

20. The method for manufacturing the shock absorber according to claim 18, wherein the circumferential length of the pressing portions is shorter than that of the joining portions, and the pressing portions are in contact with an end of the fitted portion that is closer to the annular groove while applying a pressing force.

* * * * *